(12) United States Patent
Hikosaka et al.

(10) Patent No.: US 8,845,209 B2
(45) Date of Patent: Sep. 30, 2014

(54) OPTICAL CONNECTOR WITH VERTICAL OPENING PREVENTION RIBS

(75) Inventors: Tomohiro Hikosaka, Shizuoka (JP); Kenichi Ikeya, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/822,526

(22) PCT Filed: Dec. 28, 2011

(86) PCT No.: PCT/JP2011/080603
§ 371 (c)(1),
(2), (4) Date: Mar. 12, 2013

(87) PCT Pub. No.: WO2012/091177
PCT Pub. Date: Jul. 5, 2012

(65) Prior Publication Data
US 2013/0266270 A1    Oct. 10, 2013

(30) Foreign Application Priority Data

Dec. 28, 2010   (JP) .................................. 2010-293088
Jun. 17, 2011   (JP) .................................. 2011-135489

(51) Int. Cl.
*G02B 6/36*    (2006.01)
*G02B 6/38*    (2006.01)

(52) U.S. Cl.
CPC . *G02B 6/36* (2013.01); *G02B 6/389* (2013.01); *G02B 6/3857* (2013.01); *G02B 6/3865* (2013.01); *G02B 6/3878* (2013.01); *G02B 6/3887* (2013.01); *G02B 6/3893* (2013.01)
USPC ............................................. 385/81; 385/62

(58) Field of Classification Search
CPC ............................... G02B 6/389; G02B 6/3893
USPC ........................................................ 385/62, 81
See application file for complete search history.

(56) References Cited

U.S. PATENT DOCUMENTS

5,348,493 A  *  9/1994  Power ........................... 439/352
5,370,543 A  *  12/1994  Hamada et al. ............... 439/188

(Continued)

FOREIGN PATENT DOCUMENTS

| EP | 2 161 602 A1 | 3/2010 |
| FR | 2 863 367 A1 | 6/2005 |
| JP | 2009-237496 A | 10/2009 |

OTHER PUBLICATIONS

International Search Report for PCT/JP2011/080603 dated May 29, 2012.

*Primary Examiner* — Charlie Peng
(74) *Attorney, Agent, or Firm* — Kenealy Vaidya LLP (57) ABSTRACT

An optical connector 11 is provided with a housing 17 for receiving ferrules 21 connected to an optical fiber cable, a lock arm 37 provided with the housing 17 and blocking removal from other housing fitted into the housing 17, a slit 45 formed in the housing 17, and in which the lock arm 37 moving in an unlocked direction is entered, a stopper 31 which has recesses 57 and is attached to the housing 17 to position the ferrules 21, and opening prevention ribs 59 respectively vertically provided with a pair of upper wall parts 43 of the housing 17 facing in a state of sandwiching the slit 45, the opening prevention ribs being inserted into the recesses 57 in a state of abutting on a left inner wall surface 61 and a right inner wall surface 63 of the recesses 57 so as to regulate a separation between the pair of upper wall parts 43.

3 Claims, 12 Drawing Sheets

(56) References Cited

U.S. PATENT DOCUMENTS

| | | | |
|---|---|---|---|
| 5,398,295 A * | 3/1995 | Chang et al. | 385/58 |
| 5,507,666 A * | 4/1996 | Yamanashi | 439/489 |
| 5,613,872 A * | 3/1997 | Fukuda et al. | 439/489 |
| 5,619,604 A * | 4/1997 | Shiflett et al. | 385/59 |
| 5,742,719 A | 4/1998 | Birnbaum | |
| 6,004,041 A | 12/1999 | Kunishi | |
| 6,126,480 A | 10/2000 | Kawase et al. | |
| 6,280,221 B1 * | 8/2001 | Fukase et al. | 439/315 |
| 6,354,860 B1 * | 3/2002 | Miller et al. | 439/352 |
| 6,572,400 B2 * | 6/2003 | Noguchi et al. | 439/489 |
| 6,612,862 B2 * | 9/2003 | Endo | 439/489 |
| 6,688,779 B2 * | 2/2004 | Nishita | 385/75 |
| 6,824,417 B1 * | 11/2004 | Nimura | 439/352 |
| 7,252,530 B2 * | 8/2007 | Shamoto | 439/352 |
| 7,591,668 B2 * | 9/2009 | Nakamura | 439/489 |
| 7,806,599 B2 * | 10/2010 | Margolin et al. | 385/75 |
| 8,678,846 B2 * | 3/2014 | Hitchcock et al. | 439/352 |
| 2004/0076389 A1 * | 4/2004 | Ozaki | 385/112 |
| 2004/0091214 A1 | 5/2004 | Finona | |
| 2009/0245734 A1 | 10/2009 | Nakagawa et al. | |

* cited by examiner

OPTICAL CONNECTOR WITH VERTICAL OPENING PREVENTION RIBS

TECHNICAL FIELD

The present invention relates to an optical connector used in connection between optical fibers in, for example, a LAN for automobile.

BACKGROUND ART

Figure 13:
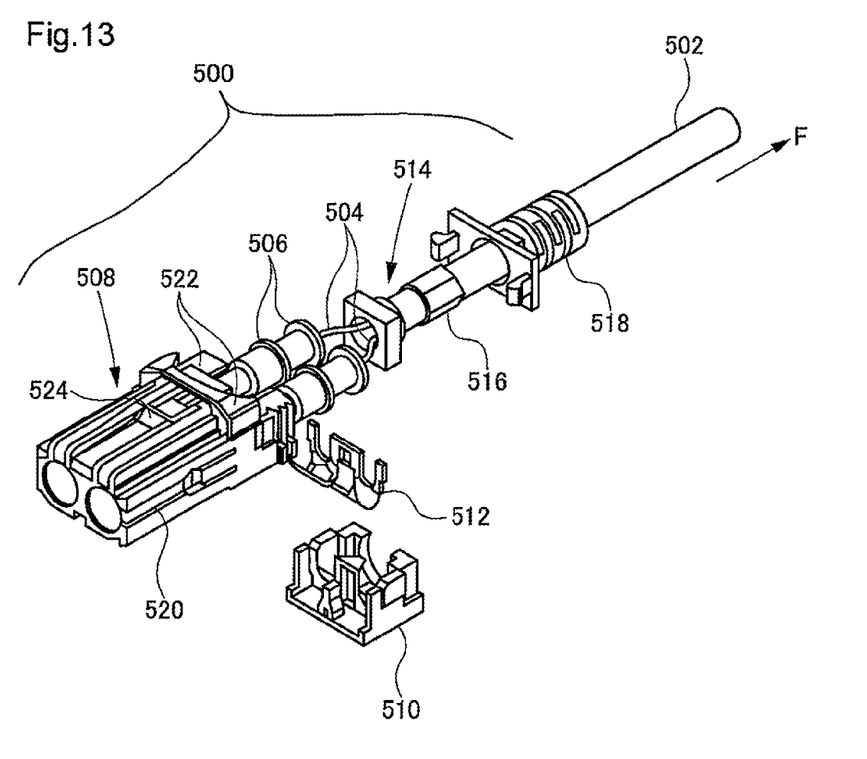
FIG. 13 is an exploded perspective view of a conventional optical connector.

An optical connector used in connection between optical fibers is known in, for example, a LAN for automobile (for example, see PTL 1). This kind of optical connector 500 includes a ferrule 506 fixed to the distal end of an optical fiber 504 of an optical fiber cable 502, a housing 508 for receiving the ferrule 506, a stopper 510 assembled to the housing 508, a leaf spring 512, a crimp sleeve 514, a crimp ring 516 and a boot 518 as shown in FIG. 13.

The housing 508 has a structure in which the distal end side is provided with a connector fitting part 520 fitted into a housing of the other connector (not shown) and also the proximal end side includes ferrule receiving space for receiving the ferrule 506. The stopper 510 is attached to the ferrule receiving space of the housing 508, and positions the ferrule 506 inside the housing 508 and prevents detachment of the leaf spring 512. The leaf spring 512 urges the ferrule 506 of the inside of the ferrule receiving space to the other connector side. This leaf spring 512 is provided in order to reduce a value of a gap between ferrule end faces opposed by fitting connection between the connectors and improve transmission performance.

Figure 14:
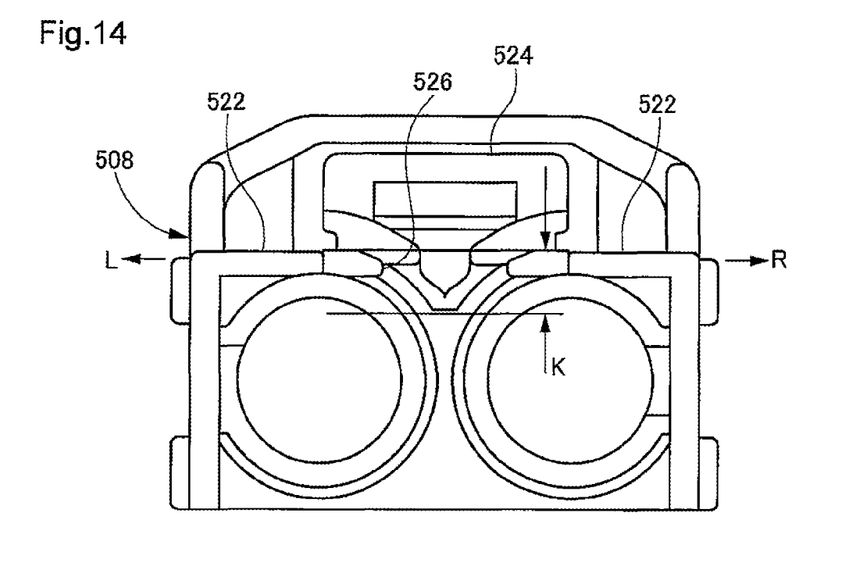
FIG. 14 is a back view of a housing shown in FIG. 13.
Figure 15:
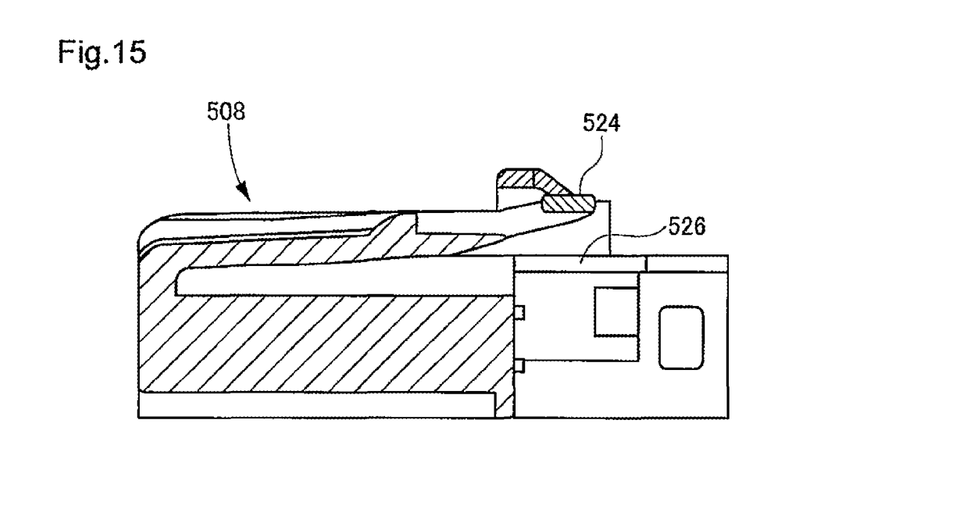
FIG. 15 is a cutaway sectional view of one side of the housing shown in FIG. 13.

Incidentally, in this optical connector 500, a slit 526 is formed in order to decrease the total height of the optical connector 500 (decrease in height). By providing upper wall parts 522 of the housing 508 shown in FIG. 14 with the slit 526 shown in FIG. 15 which the lower portion of a lock arm 524 can enter, the height of the optical connector 500 can be decreased by the amount K (see FIG. 14) in which the lower portion of the lock arm 524 can avoid interference with the upper wall parts 522.

CITATION LIST

Patent Literature
[PTL 1] JP-A-2009-237496

SUMMARY OF INVENTION

Technical Problem

However, in the conventional optical connector 500 described above, the upper wall parts 522 of the housing 508 are provided with the slit 526, so that, for example, when tension F (see FIG. 13) is applied to the optical fiber cable 502, the housing 508 opens to the right and left (a direction of arrows LR in FIG. 14) around the slit 526 and the crimp sleeve 514 received inside the housing 508 may be detached.

The present invention has been implemented in view of the circumstances, and an object of the present invention is to provide an optical connector capable of preventing detachment of a crimp sleeve by opening of a housing in the case of applying tension to an optical fiber cable.

Solution to Problem

The object according to the present invention is achieved by the following configurations.

(1) An optical connector, comprising a housing receiving a ferrule connected to an optical fiber cable; a lock arm provided with the housing and blocking removal from other housing fitted into the housing; a slit formed in the housing and in which the lock arm moving in an unlocked direction is entered; a stopper including a recess into which an optical fiber led out of the ferrule is inserted, and attached to the housing so as to position the ferrule; and first opening prevention ribs respectively vertically provided with a pair of upper wall parts of the housing facing in a state of sandwiching the slit, the first opening prevention ribs being inserted into the recess in a state of abutting on a left inner wall surface and a right inner wall surface of the recess so as to regulate a separation between the pair of upper wall parts.

According to the optical connector of the configuration of (1), in the housing, each of the pair of upper wall parts facing in a state of sandwiching the slit is provided (vertically provided) with the first opening prevention ribs projecting downward and when the stopper is attached to the housing, the first opening prevention ribs are inserted and arranged in the recess formed in the stopper. A pair of first opening prevention ribs arranged in the recess respectively abuts on the left inner wall surface and the right inner wall surface of the recess. When tension is applied to the optical fiber cable, the housing tends to open around the slit, but the first opening prevention ribs drooping from the right and left upper wall parts of the slit block opening of the housing by reaction forces from the left inner wall surface and the right inner wall surface of the recess.

(2) An optical connector comprising a housing for receiving a ferrule connected to an optical fiber cable; a lock arm provided with the housing and blocking removal from other housing fitted into the housing; a slit formed in the housing and in which the lock arm moving in an unlocked direction is entered; a crimp sleeve having a tube part inserted into a sleeve through-hole formed in a back wall part of the housing while an optical fiber is inward inserted, and a flange part for pinching and which is consecutively installed in the tube part and is opposed to a back wall inner surface of the housing; and second opening prevention ribs respectively vertically with a pair of upper wall parts of the housing facing in a state of sandwiching the slit, the second opening prevention ribs being engaged with opening prevention engaging parts formed in an opposed edge in the flange part for pinching so as to regulate a separation between the pair of upper wall parts.

According to the optical connector of the configuration of (2), in the housing, each of the pair of upper wall parts facing in a state of sandwiching the slit is provided (vertically provided) with the second opening prevention ribs projecting downward and when the crimp sleeve is attached to the housing, the second opening prevention ribs are inserted and locked in the opening prevention engaging parts formed in the flange part for pinching of the crimp sleeve. A pair of second opening prevention ribs locked in the opening prevention engaging parts regulates movement of a separation direction. When tension is applied to the optical fiber cable, the housing tends to open around the slit, but the second opening prevention ribs drooping from the right and left upper wall parts of the slit block opening of the housing by reaction forces from the opening prevention engaging parts.

(3) In an optical connector of the configuration of (1), an optical fiber bending R regulation part through which an optical fiber led out of the ferrule passes is formed in the first opening prevention rib.

According to the optical connector of the configuration of (3), the first opening prevention rib for entering the recess of the stopper traverses a lead-out path of the optical fiber and the optical fiber is passed through the optical fiber bending R regulation part formed in the first opening prevention rib and thereby, a situation in which the optical fiber is led out in a greatly-bent detour path can be avoided.

Advantageous Effects of Invention

According to the optical connector according to the present invention, detachment of the crimp sleeve by opening of the housing around the slit in the case of applying tension to the optical fiber cable can be prevented.

DESCRIPTION OF EMBODIMENTS

Embodiments of the present invention will hereinafter be described with reference to the drawings.

Figure 1:
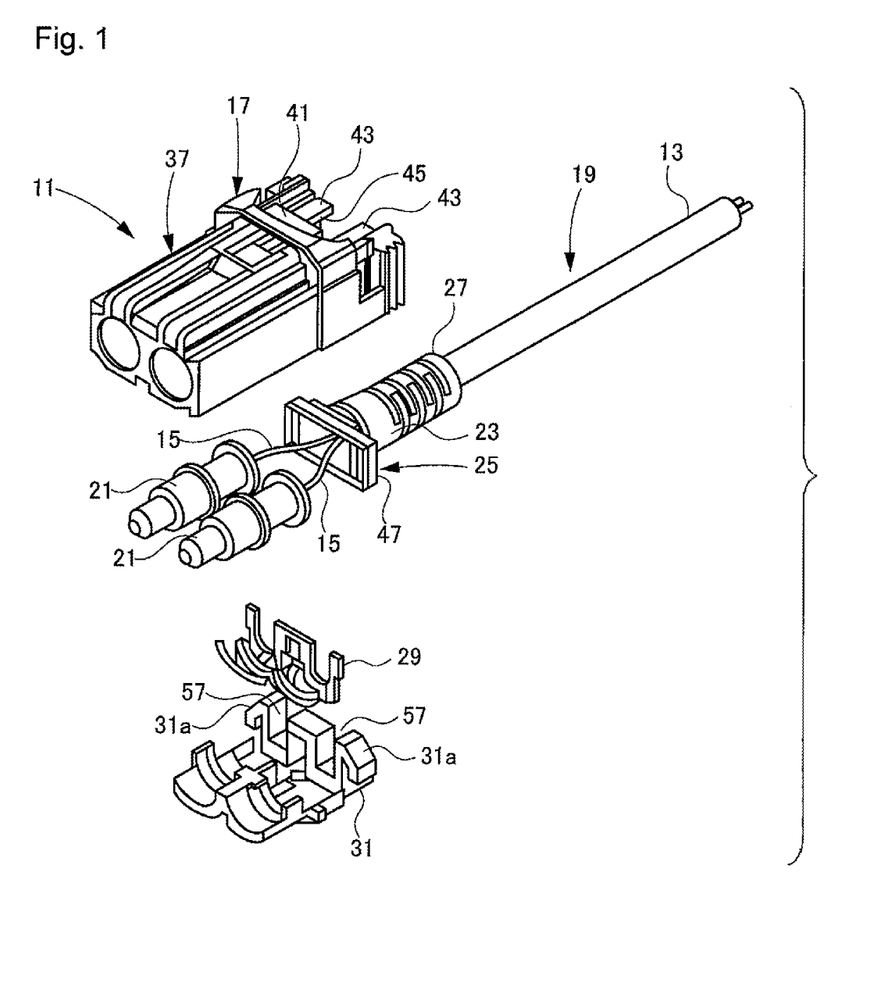
FIG. 1 is an exploded perspective view of an optical connector according to a first embodiment of the present invention.

FIG. 1 is an exploded perspective view of an optical connector 11 according to a first embodiment of the present invention.

The optical connector 11 according to the first embodiment is coupled to the other connector (not shown) and makes connection between optical fibers in, for example, a LAN for automobile. The optical connector 11 makes connection in a state of butting the distal end of an optical fiber 15 which is a core wire of an optical fiber cable 13 by being coupled to the other connector.

In the optical connector 11, a ferrule assembly 19 is attached to a housing 17. The ferrule assembly 19 includes a ferrule 21 for guide of the optical fiber 15, the optical fiber cable 13, a crimp ring 23 for crimping and fixing the optical fiber cable 13 and the housing 17, a crimp sleeve 25, and a boot 27 for fiber bending regulation. In addition, in the specification, for convenience of explanation, the lead-out side of the optical fiber cable 13 and its opposite side are set in the back side and the front side, and the side of the housing 17 to which the ferrule assembly 19 is attached and its opposite side are set in the lower side and the upper side, respectively.

In the ferrule assembly 19, the ferrule 21 is assembled to the distal end of the optical fiber 15 after the boot 27, the crimp ring 23 and the crimp sleeve 25 for inserting the optical fiber 15 are attached by end processing. The ferrule 21 assembled to the distal end of the optical fiber 15 is fixed to the optical fiber 15 by an adhesive etc.

The optical connector 11 is assembled by further attaching a leaf spring 29 and a stopper 31 after the ferrule assembly 19 is attached to the housing 17. Together with the stopper 31, the leaf spring 29 is inserted into the housing 17 in a state of being held in the stopper 31.

Figures 2A, 2B, 2C:
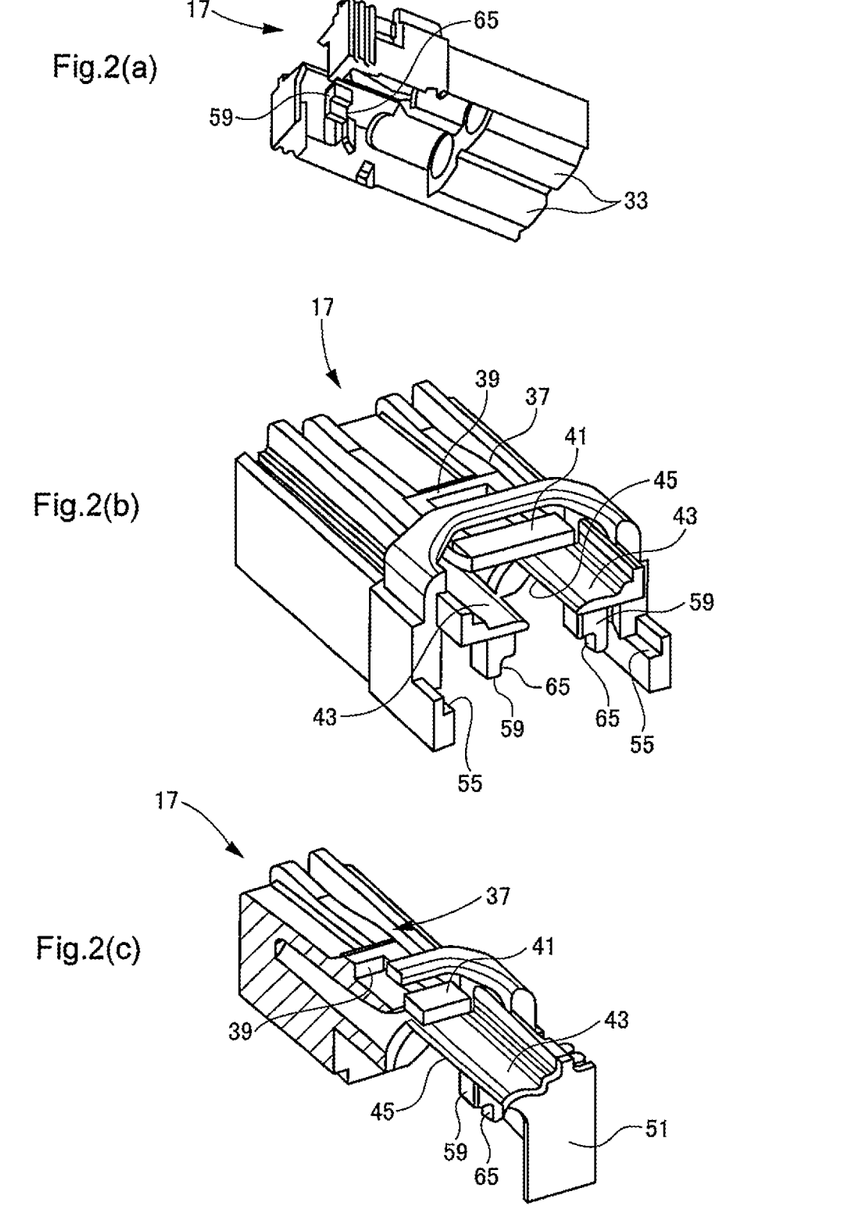
FIG. 2(a) is a perspective view in the case of viewing a housing shown in FIG. 1 from the oblique lower portion.
FIG. 2(b) is a perspective view in the case of viewing its housing from the oblique upper portion.
FIG. 2(c) is a cutaway perspective view of one side of its housing.
Figure 3A:
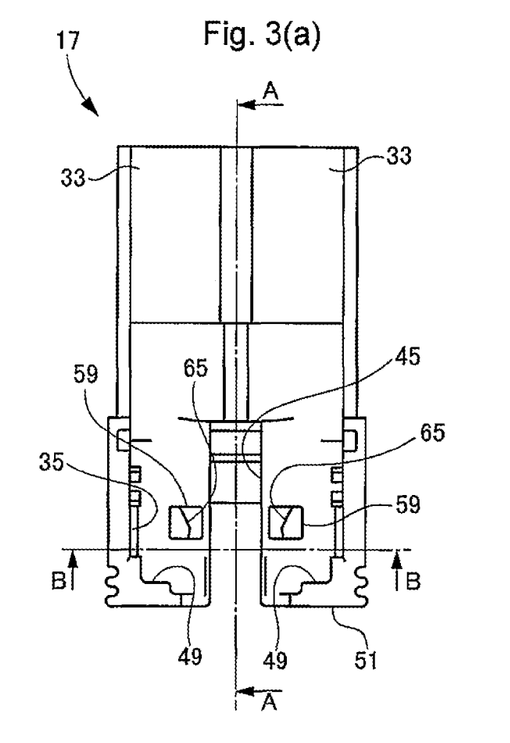
FIG. 3(a) is a bottom view of the housing shown in FIG. 2.
Figure 3B:
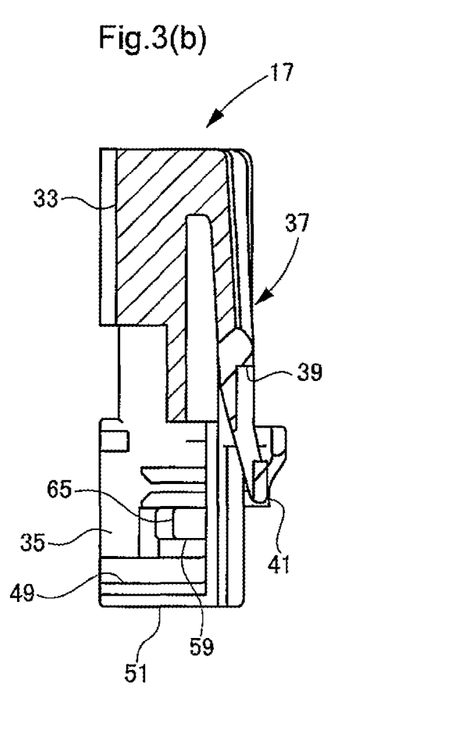
FIG. 3(b) is a sectional view taken on line A-A of FIG. 3(a)
Figure 3C:
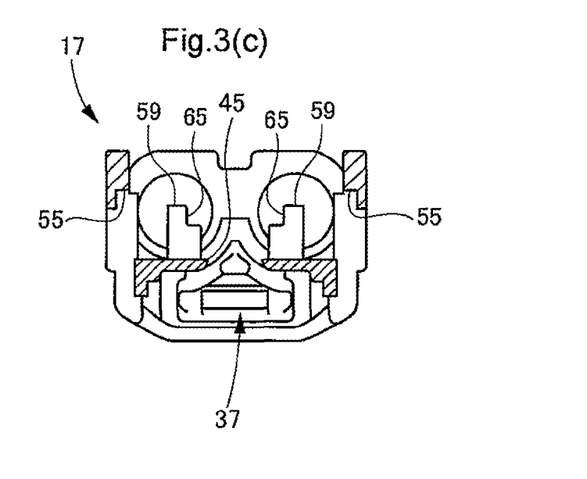
FIG. 3(c) is a sectional view taken on line B-B of FIG. 3(a).
Figure 4:
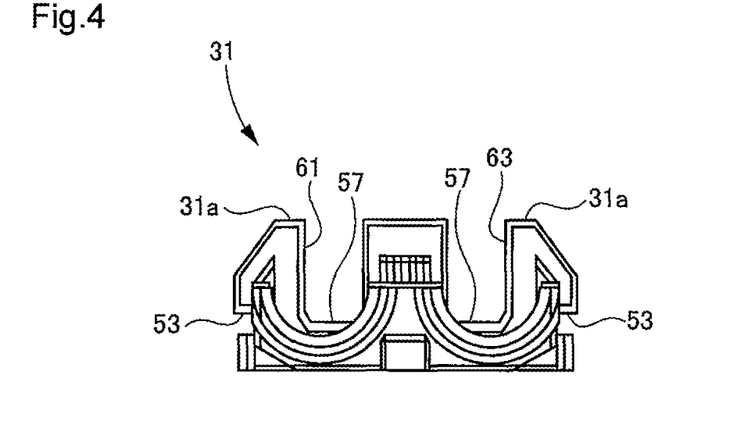
FIG. 4 is a front view of a stopper shown in FIG. 1.

FIG. 2(a) is a perspective view in the case of viewing the housing 17 shown in FIG. 1 from the oblique lower portion, and FIG. 2(b) is a perspective view in the case of viewing its housing 17 from the oblique upper portion, and FIG. 2(c) is a cutaway perspective view of one side of its housing 17, and FIG. 3(a) is a bottom view of the housing 17 shown in FIGS. 2(a), 2(b) and 2(c), and FIG. 3(b) is a sectional view taken on line A-A of FIG. 3(a), and FIG. 3(c) is a sectional view taken on line B-B of FIG. 3(a), and FIG. 4 is a front view of the stopper 31 shown in FIG. 1.

As shown in FIGS. 2(a), 2(b) and 2(c), in the housing 17 integrally molded by a synthetic resin material, a tubular insertion part 33 for inserting the ferrule 21 is formed in the front. In the embodiment, the tubular insertion parts 33 are juxtaposed in two lines. A stopper insertion part 35 is formed in the back of the tubular insertion part 33. The proximal end of a lock arm 37 for blocking removal from a housing (not shown) of the other connector is connected to an upper surface of the tubular insertion part 33. The lock arm 37 has a locking protrusion 39 on an upper surface, and an operation distal end part 41 forms a free end.

The lock arm 37 is unlocked by elastically displacing the operation distal end part 41 so as to move near to an upper wall part 43 of the housing 17. A slit 45 which the lower portion of the operation distal end part 41 enters is formed in the upper wall part 43 of the housing 17. The slit 45 permits entrance of the lock arm 37 moving in an unlocked direction. By providing the optical connector 11 with the slit 45, a decrease in height of the optical connector 11 is achieved by the amount in which the lower portion of the lock arm 37 can avoid interference with the upper wall part 43.

A sleeve seat 49 shown in FIGS. 3(a), 3(b) and 3(c) for retaining a flange part 47 (see FIG. 1) of the crimp sleeve 25 is formed in the back of the stopper insertion part 35. The rear of the sleeve seat 49 forms a back wall part 51 of the housing 17. The upper wall part 43, the stopper insertion part 35, the sleeve seat 49 and the back wall part 51 are divided into the right and left portions by the slit 45. That is, a pair of upper wall parts 43 faces in a state of sandwiching the slit 45.

As shown in FIG. 4, erect protrusions 31a are erected in both sides of the stopper 31 and the distal ends of the erect protrusions 31a can be elastically displaced. In the erect protrusions 31a, locking parts 53 of both sides are locked in side plate step parts 55 (see FIGS. 2(a), 2(b) and 2(c)) formed in both sides of an inner surface of the housing 17. The stopper 31 attached to the housing 17 by locking the erect protrusions 31a in the side plate step parts 55 regulates detachment of the leaf spring 29 while positioning the ferrule 21. The leaf spring 29 urges the ferrule 21 to the other connector side. This leaf spring 29 reduces a value of a gap between ferrule end faces opposed by fitting connection between the connectors and improves transmission performance.

Incidentally, recesses 57 in which the optical fibers 15 led out of the ferrules 21 are inserted inside the right and left erect protrusions 31a are formed in the stopper 31. When the stopper 31 is attached to the stopper insertion part 35, the recesses 57 are opposed to lower surfaces of the upper wall parts 43. The lower surfaces of the respective upper wall parts 43 opposed to the recesses 57 are provided (vertically provided) with downward projecting opening prevention ribs (first opening prevention ribs) 59 inserted into the recesses 57. The respective opening prevention ribs 59 entering the recesses 57 work so as to regulate a separation between a pair of upper wall parts 43 by being inserted into the recesses 57 in a state of abutting on a left inner wall surface 61 and a right inner wall surface 63 of the recesses 57.

Also, an optical fiber bending R regulation part 65 in which an adjacent inside corner of the lower portion is notched is formed in this opening prevention rib 59. The optical fiber 15 led out of the ferrule 21 passes through this optical fiber bending R regulation part 65. In the housing 17 of the optical connector 11, the opening prevention rib 59 for entering the recess 57 formed in the stopper 31 traverses a lead-out path of the optical fiber 15 and the optical fiber 15 is passed through this optical fiber bending R regulation part 65 formed in the opening prevention rib 59 and thereby, a situation in which the optical fiber 15 is led out in a greatly-bent detour path is avoided.

Next, action of the optical connector 11 having the configuration mentioned above will be described.

Figure 5:
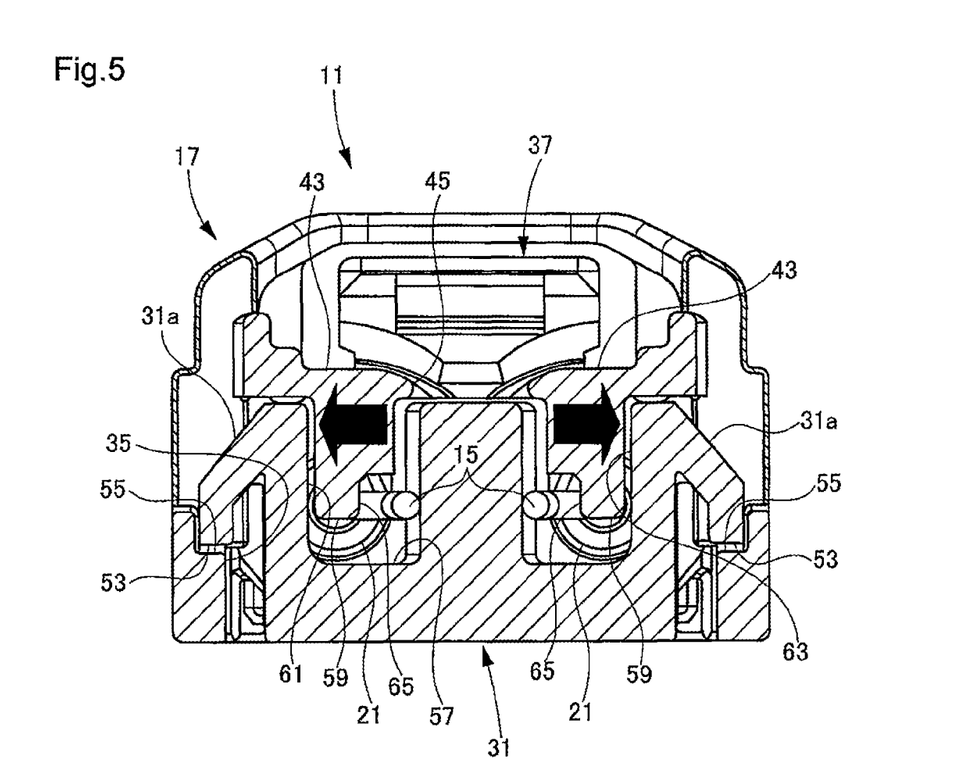
FIG. 5 is a back sectional view of the optical connector to which the stopper is attached.
Figure 6:
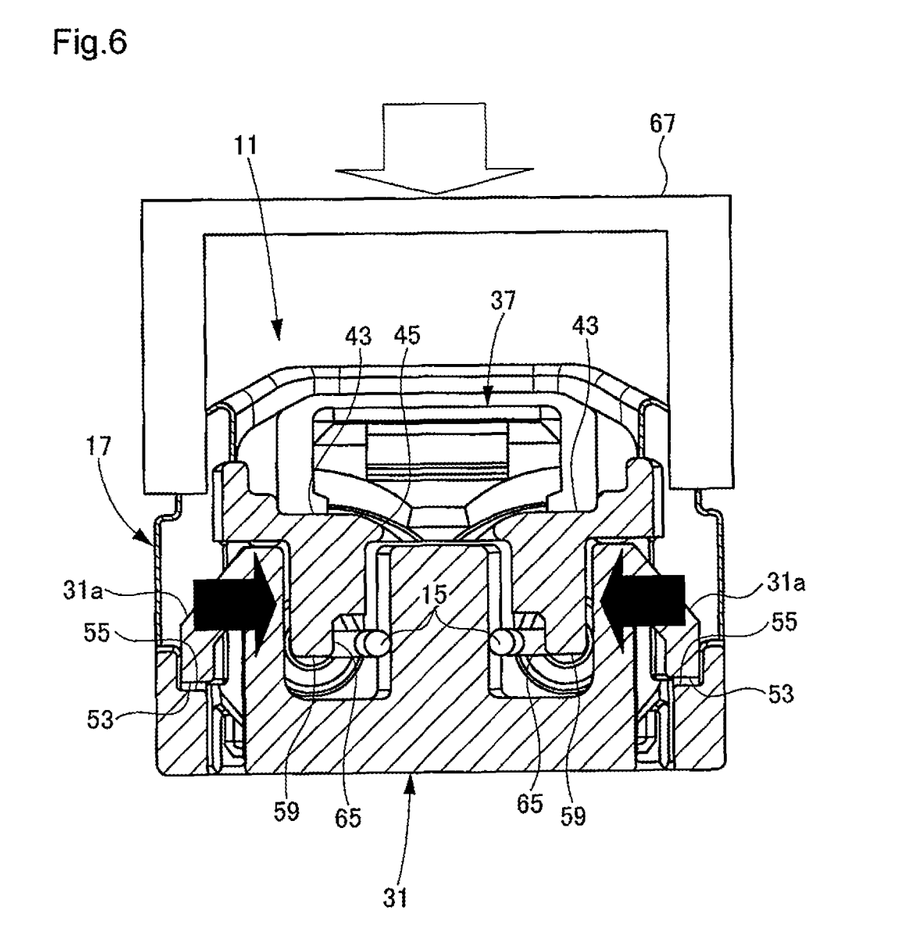
FIG. 6 is a back sectional view of the optical connector at the time of detaching the stopper.

FIG. 5 is a back sectional view of the optical connector 11 to which the stopper 31 is attached, and FIG. 6 is a back sectional view of the optical connector 11 at the time of detaching the stopper 31.

In the optical connector 11, the ferrule 21 of the ferrule assembly 19 is inserted into the tubular insertion part 33 after the ferrule assembly 19 is assembled. Next, the stopper 31 for holding the leaf spring 29 is attached to the stopper insertion part 35 of the housing 17 as shown in FIG. 5. The stopper 31 is positioned between the ferrule 21 and the crimp sleeve 25. Therefore, the optical fiber 15 led out of the ferrule 21 passes through the optical fiber bending R regulation part 65 of the opening prevention rib 59. Consequently, a fracture by excessive bending in the optical fiber 15 is prevented.

In the back of the optical fiber 15, the crimp sleeve 25 is arranged in a state of abutting on the sleeve seat 49. Then, since each of the pair of upper wall parts 43 facing in a state of sandwiching the slit 45 is provided with the downward projecting opening prevention rib 59, the opening prevention rib 59 is inserted and arranged in the recess 57 formed in the stopper 31 when the stopper 31 is attached to the housing 17. A pair of opening prevention ribs 59 arranged in the recesses 57 abuts on the left inner wall surface 61 and the right inner wall surface 63 of the recesses 57.

When an external force in a tensile direction acts on the optical fiber cable 13 in the outside of the housing 17 in this state, the right and left back wall parts 51 (see FIGS. 2(a), 2(b), and 2(c)) of the housing 17 tend to open around the slit 45. In this case, the opening prevention ribs 59 drooping from the right and left upper wall parts 43 of the slit block opening of the housing 17 by reaction forces from the left inner wall surface 61 and the right inner wall surface 63 of the recesses 57. Even when, for example, under harness tension, the crimp sleeve 25 is pulled and the housing 17 tends to open around the slit 45 thus, a force of an opening direction is inhibited by the opening prevention ribs 59 abutting on the recesses 57 provided in the stopper 31 and opening of the housing 17 is blocked.

Also, in order to achieve easy dismantlement properties, the stopper 31 can be released by pushing the erect protrusions 31 a of the stopper 31 from the outside with a release jig 67 shown in FIG. 6, and destruction of the erect protrusions 31a by an excessive push at the time of release work can also be prevented by the opening prevention ribs 59 provided on the housing 17.

Next, an optical connector 71 according to a second embodiment of the present invention will be described.

Figure 7:
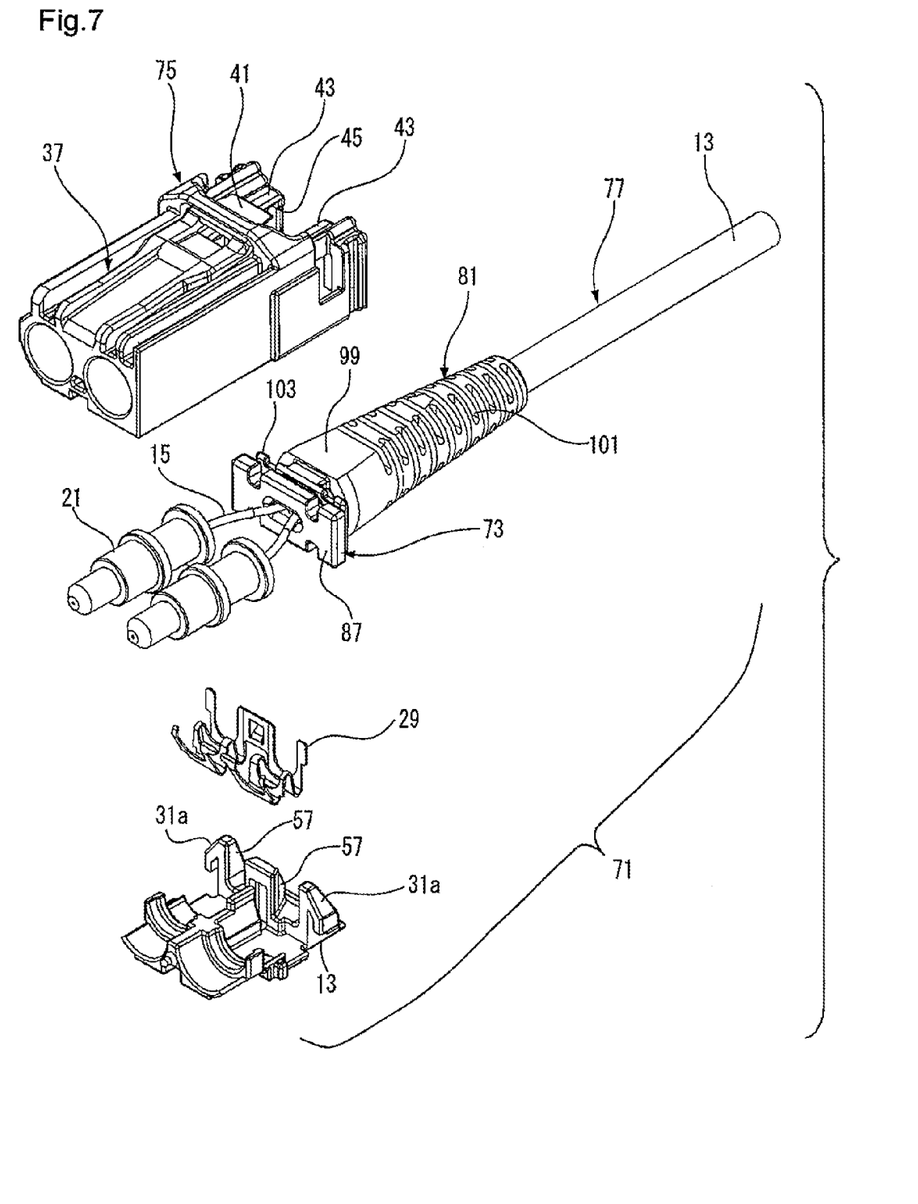
FIG. 7 is an exploded perspective view of an optical connector according to a second embodiment of the present invention.
Figure 8:
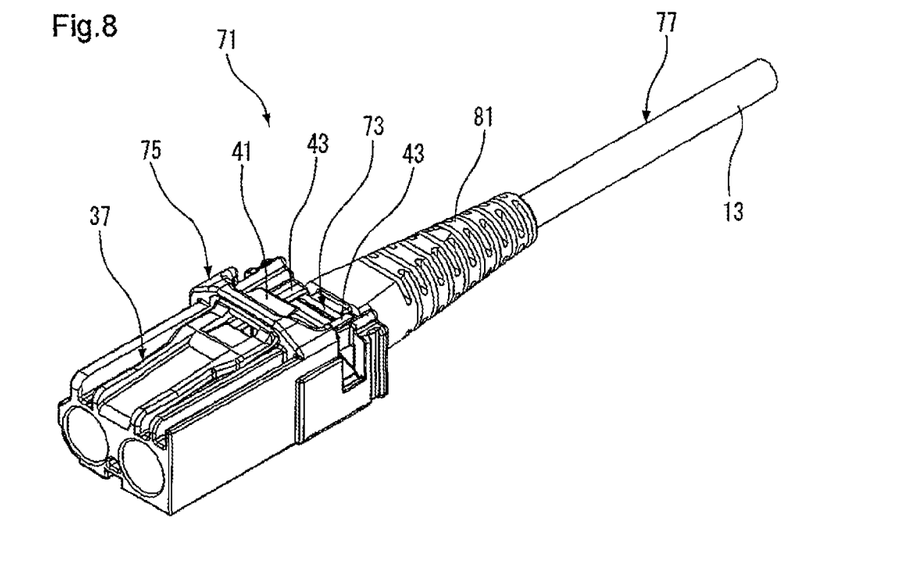
FIG. 8 is an outline perspective view of the optical connector shown in FIG. 7.
Figure 9:
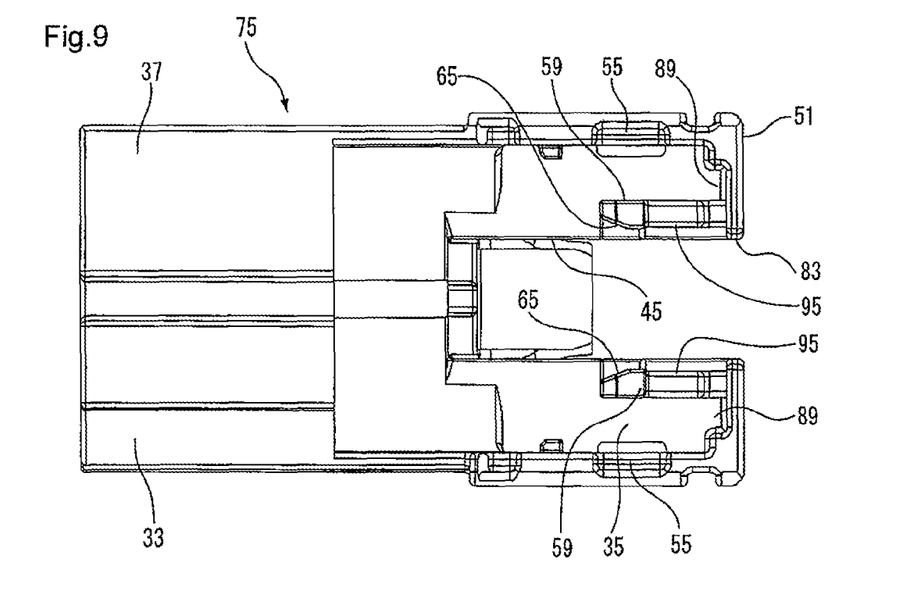
FIG. 9 is a bottom view of a housing shown in FIG. 7.
Figure 10:
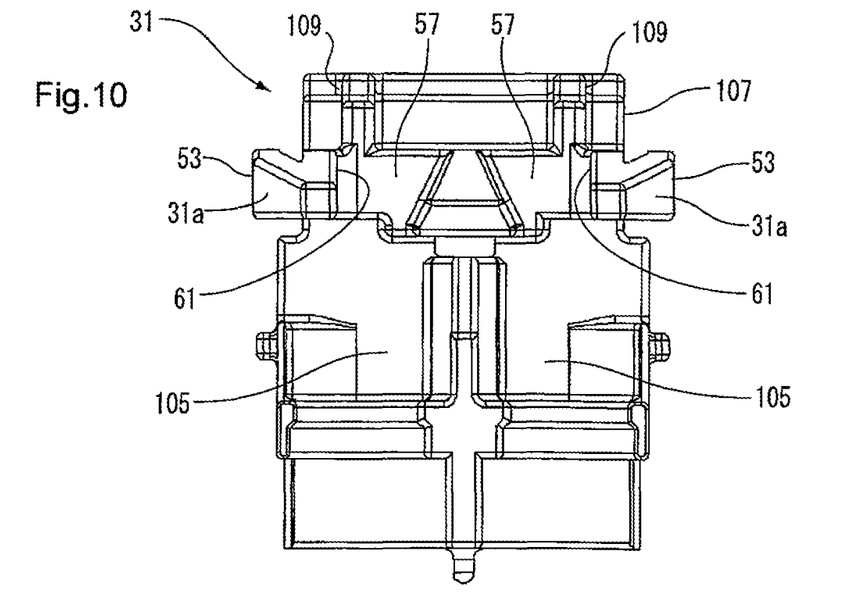
FIG. 10 is a plan view of a stopper shown in FIG. 7.
Figure 11:
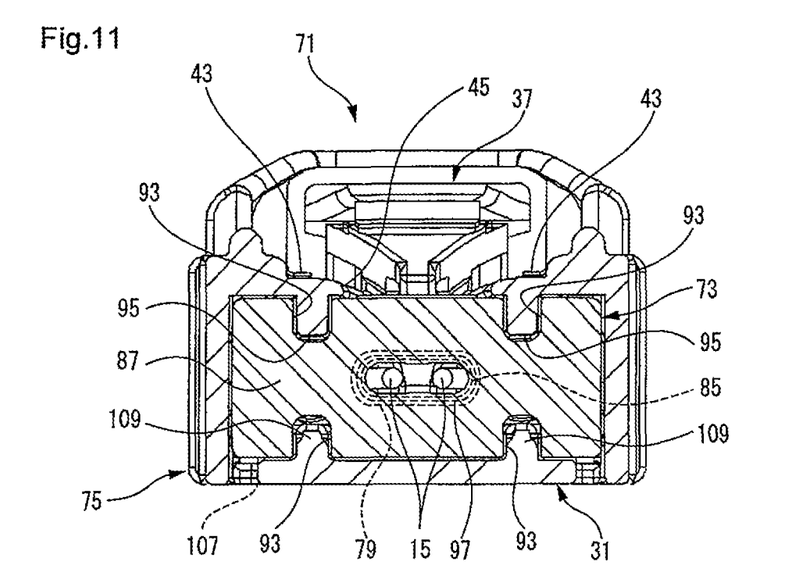
FIG. 11 is a sectional view of the portion in which a flange part for pinching of a crimp sleeve in the optical connector shown in FIG. 8 is received.
Figure 12:
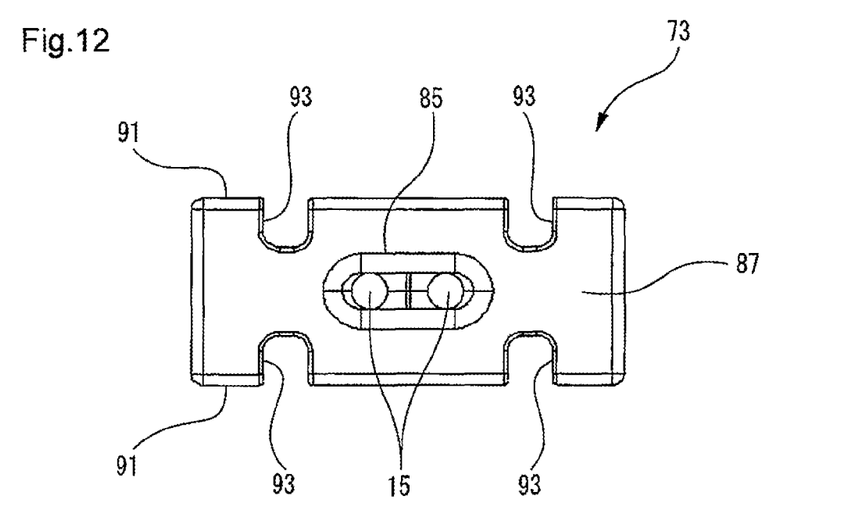
FIG. 12 is a front view of the crimp sleeve shown in FIG. 7.

FIG. 7 is an exploded perspective view of the optical connector 71 according to the second embodiment of the present invention, and FIG. 8 is an outline perspective view of the optical connector 71 shown in FIG. 7, and FIG. 9 is a bottom view of a housing 75 shown in FIG. 7, and FIG. 10 is a plan view of a stopper 31 shown in FIG. 7, and FIG. 11 is a sectional view of the portion in which a flange part 87 for pinching of a crimp sleeve 73 in the optical connector 71 shown in FIG. 8 is received, and FIG. 12 is a front view of the crimp sleeve 73. In addition, the overlap explanation is omitted by assigning the same numerals to members and sites equivalent to those of the optical connector 11 according to the first embodiment described above.

The optical connector 71 according to the present second embodiment has a structure of having an opening prevention function in the crimp sleeve 73 which is a rigid body. This opening prevention function may be used singly or be used in combination with a structure by the opening prevention ribs 59 and the recesses 57 of the first embodiment. The second embodiment illustrates the case of using both the structures in combination.

In the optical connector 71, a ferrule assembly 77 is attached to the housing 75 as shown in FIGS. 7 and 8. The ferrule assembly 77 includes a ferrule 21 for guide of an optical fiber 15, an optical fiber cable 13, a crimp ring 79 (see FIG. 11) for crimping and fixing the optical fiber cable 13, the crimp sleeve 73, and a boot 81 for fiber bending regulation. That is, the optical connector 71 of the second embodiment differs from the optical connector 11 of the first embodiment in forms of the housing 75, the ferrule assembly 77, the crimp ring 79, the crimp sleeve 73 and the boot 81.

A sleeve through-hole 83 is formed in a back wall part 51 of the housing 75 as shown in FIG. 9. The optical fiber 15 connected to the ferrule 21 is led out of the sleeve through-hole 83. The crimp sleeve 73 is interposed between this optical fiber 15 and the sleeve through-hole 83.

The crimp sleeve 73 is made of a hard resin material, and has a tube part 85 (see FIG. 11) inserted into the sleeve through-hole 83 formed in the back wall part 51 of the housing 75 while the optical fiber 15 is inward inserted. The rectangular flange part 87 for pinching is connected in a consecutive state and is provided (consecutively installed) in the front of the tube part 85. The tube part 85 is formed integrally to the flange part 87 for pinching. The flange part 87 for pinching is made of a hard resin material having a predetermined thickness and thereby is formed in a rigid body with deformation smaller than that of the housing 75.

The flange part 87 for pinching is arranged as opposed to a back wall inner surface 89 of the housing 75 as shown in FIG. 9. That is, the crimp sleeve 73 is assembled to the housing 75 so that the tube part 85 is inserted into the sleeve through-hole 83 and the flange part 87 for pinching is opposed to the back wall inner surface 89. The optical fiber 15 is inserted into the tube part 85 of the crimp sleeve 73 assembled in this manner.

As shown in FIG. 12, plural opening prevention engaging parts 93 are formed in upper and lower edges (edges) 91 of the flange part 87 for pinching. In the embodiment, a total of four opening prevention engaging parts 93 are formed by one pair in the upper and lower edges 91 and as shown in FIG. 11, opening prevention ribs (second opening prevention ribs) 95 formed in the housing 75 engage with the opening prevention engaging parts 93 of the upper edge 91 in the flange part 87 for pinching in the case of being attached to the housing 75. A pair of upper wall parts 43 of the housing 75 facing in a state of sandwiching a slit 45 is respectively vertically provided with the opening prevention ribs 95. The opening prevention ribs 95 act so as to regulate a separation between a pair of upper wall parts 43 by engaging with the opening prevention engaging parts 93 formed in the opposed upper edge 91 in the flange part 87 for pinching.

In addition, in the optical fiber cable 13, the outer periphery of the tube part 85 is coated with an outer coat 97 (see FIG. 11) while the optical fiber 15 is led out of the tube part 85 of the crimp sleeve 73. The outer coat 97 with which the tube part 85 is coated is fixed to the tube part 85 by crimping the crimp ring 79 from the outside of the outer coat 97. Consequently, the optical fiber cable 13 is fixed integrally to the crimp sleeve 73. When the optical fiber cable 13 is pulled, the flange part 87 for pinching abuts on the back wall inner surface 89 and detachment of the crimp sleeve 73 is regulated.

The boot 81 is made of a soft material such as rubber, and has a protection part 99 inserted into the outer periphery of the crimp ring 79 and the optical fiber cable 13. Plural peripheral grooves 101 for providing the protection part 99 with proper flexibility are formed in the periphery of the protection part 99. The boot 81 has a rectangular flange part 103 which passes through the sleeve through-hole 83 and is consecutively installed in the protection part 99. The boot 81 is assembled to the housing 75 with this flange part 103 sandwiched between the flange part 87 for pinching of the crimp sleeve 73 and the back wall inner surface 89 of the housing 75.

Also, in the stopper 31, a cover piece 107 is projected and molded in the side opposite to leaf spring receiving spaces 105 in a state of sandwiching locking parts 53 as shown in FIG. 10. The cover piece 107 regulates removal of the crimp sleeve 73 by dosing a back lower surface of the housing 75 as shown in FIG. 11. A pair of projections 109 is formed in the cover piece 107, and the projections 109 are fitted into the opening prevention engaging parts 93, into which the opening prevention ribs 95 are not fitted, of the side of the lower edge 91 in the flange part 87 for pinching.

Next, action of the optical connector 71 having the configuration mentioned above will be described.

According to the optical connector 71 of the second embodiment, in the housing 75, each of the pair of upper wall parts 43 facing in a state of sandwiching the slit 45 is provided with the downward projecting opening prevention ribs 95 and when the crimp sleeve 73 is attached to the housing 75, the opening prevention ribs 95 are inserted and locked in the opening prevention engaging parts 93 formed in the flange part 87 for pinching of the crimp sleeve 73. A pair of opening prevention ribs 95 locked in the opening prevention engaging parts 93 regulates movement of a separation direction. When tension is applied to the optical fiber cable 13, the housing 75 tends to open around the slit 45, but the opening prevention ribs 95 drooping from the right and left upper wall parts 43 of the slit 45 block opening of the housing 75 by reaction forces from the opening prevention engaging parts 93.

Since the crimp sleeve 73 is a rigid body, opening of the housing 75 can be inhibited even when a great force is applied. Also, according to this configuration, it is unnecessary to increase lock rigidity of the stopper 31, so that workability of assembly and disassembly is not reduced. Further, it becomes unnecessary to pay attention to an assembly direction at the time of assembly work by symmetrically providing the upper and lower sides (the opposed upper and lower edges 91) of the crimp sleeve 73 with the opening prevention engaging parts 93.

Therefore, according to the optical connector 11 or the optical connector 71 according to the embodiment described above, detachment of the crimp sleeve 25 and the crimp sleeve 73 by opening of the housing 17 or the housing 75 around the slit 45 in the case of applying tension to the optical fiber cable 13 can be prevented.

In addition, the configurations of the optical fiber cable, the ferrule, the housing, the lock arm, the slit, the recess, the first and second opening prevention ribs, the stopper, the crimp sleeve, the opening prevention engaging part, etc. according to the optical connector of the present invention are not limited to the configurations of the embodiments described above, and various forms can naturally be adopted based on the gist of the present invention.

This application is based upon claims the benefit of priority of Japanese Patent Application No. 2010-293088 filed on Dec. 28, 2010, and Japanese Patent Application No. 2011-135489 filed on Jun. 17, 2011, the contents of which are incorporated herein by reference.

INDUSTRIAL APPLICABILITY

According to the optical connector according to the present invention, detachment of the crimp sleeve by opening of the housing around the slit in the case of applying tension to the optical fiber cable can be prevented.

REFERENCE SIGN LIST 11,71 Optical Connector
13 Optical Fiber Cable
15 Optical Fiber
17,75 Housing
21 Ferrule
31 Stopper
37 Lock Arm
43 Upper Wall Port
45 Slit
51 Back Wall Part
57 Recess
59 Opening Prevention Rib (First Opening Prevention Rib)
61 Left Inner Wall Surface
63 Right Inner Wall Surface
65 Optical Fiber Binding R Regulation Part
73 Crimp Sleeve
83 Sleeve Through-hole
85 Tube Part
87 Flange Part for Pinching
89 Back Wall Inner Surface
91 Upper and Lower Edges (Edges)
93 Opening Prevention Engaging Part
95 Opening Prevention Rib (Second Opening Prevention Rib)

The invention claimed is:

1. An optical connector, comprising:
a housing receiving a ferrule connected to an optical fiber;
a lock arm provided with the housing and blocking removal from other housing fitted into the housing;
a slit formed in the housing and in which the lock arm moving in an unlocked direction is entered;

a stopper including a recess into which the optical fiber led out of the ferrule is inserted, and attached to the housing so as to position the ferrule; and an opening prevention ribs respectively vertically provided with a pair of upper wall parts of the housing facing in a state of sandwiching the slit, the opening prevention ribs being inserted into the recess in a state of abutting on a left inner wall surface and a right inner wall surface of the recess so as to regulate a separation between the pair of upper wall parts.

2. An optical connector comprising:

a housing for receiving a ferrule connected to an optical fiber;

a lock arm provided with the housing and blocking removal from other housing fitted into the housing;

a slit formed in the housing and in which the lock arm moving in an unlocked direction is entered;

a crimp sleeve having a tube part inserted into a sleeve through-hole formed in a back wall part of the housing while the optical fiber is inward inserted, and a flange part for pinching and which is consecutively installed in the tube part and is opposed to a back wall inner surface of the housing; and an opening prevention ribs respectively vertically provided with a pair of upper wall parts of the housing facing in a state of sandwiching the slit, the opening prevention ribs being engaged with opening prevention engaging parts formed in an opposed edge in the flange part for pinching so as to regulate a separation between the pair of upper wall parts.

3. The optical connector as claimed in claim 1, wherein an optical fiber bending R regulation part through which the optical fiber led out of the ferrule passes is formed in the opening prevention rib.

* * * * *